E. R. CALTHROP.
PARACHUTE LAUNCHING DEVICE.
APPLICATION FILED SEPT. 13, 1917.
1,302,898.
Patented May 6, 1919.
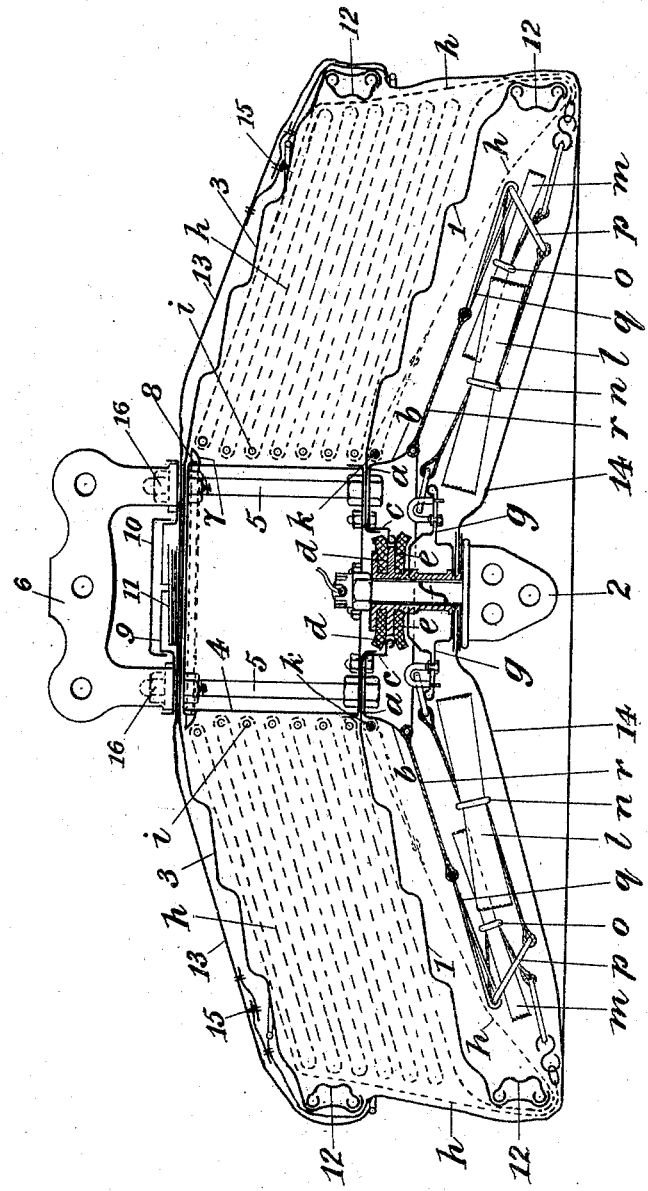
Everard Richard Calthrop
Inventor
by
Attorney

UNITED STATES PATENT OFFICE.

EVERARD RICHARD CALTHROP, OF LONDON, ENGLAND.

PARACHUTE-LAUNCHING DEVICE.

1,302,898.          Specification of Letters Patent.      Patented May 6, 1919.

Application filed September 13, 1917. Serial No. 191,287.

*To all whom it may concern:*

Be it known that I, EVERARD RICHARD CALTHROP, a subject of the King of Great Britain, residing at London in the county of Middlesex, England, have invented new and useful Improvements Relating to Parachute-Launching Devices, of which the following is a specification.

This invention relates to an improved device for launching a parachute from aircraft of the kind described in the specification of Letters Patent No. 1246874 in which the parachute is retained in symmetrical folds or plaits upon a launching disk and automatically launched therefrom by the weight of the passenger, the launching disk comprising a flanged annular frame to which the disk is positively secured, the said disk and folded and plaited parachute body with its associated parts being inclosed in a two part waterproof envelop or casing, the parts of which are secured along a horizontal junction about the circumference of the envelop. It has been found however when launching such a parachute from an aeroplane traveling at high speed that there is a possibility of the upper part of the envelop or casing interfering with the freeing of the parachute body from the launching disk. The main reason for this interference with the successful operation of the apparatus is that the very considerable air pressure which is exerted on the device when suspended from the fuselage of an aeroplane traveling at high speed causes it to be turned at right angles to its normal position and when the load is applied the full force of the air resistance plus the effects of the propeller current is exerted upon the aforesaid upper cover which is thus forced against the nested parachute with the result that jamming or binding of the parachute body against the launching disk is liable to occur thus preventing the proper launching of the parachute.

Now the primary object of the present invention is to provide means whereby any danger of the parachute body being impeded during launching shall be entirely obviated.

With this end in view the invention in its broadest aspect may be said to consist in the provision in a parachute launching device of the kind referred to of means for shielding or protecting the nested parachute body from the effects of adverse air pressures.

More specifically regarded the invention consists in the provision in a parachute launching device of the kind referred to of an upper rigid disk spaced above and suitably supported by the aforesaid launching disk said upper disk being so constructed and mounted that it may be readily detached from the launching disk to facilitate the assemblage or nesting of the parachute body upon this latter which is effected by radially plaiting and laying the same in concentric folds on the upper surface of the launching disk, each fold being temporarily secured by a thread tied around it. When the whole of the said body is thus stowed the periphery is brought over the edge of the said disk for attachment to the tapes or rigging stowed below the launching disk.

In order that my invention may be readily understood and carried into effect I will now proceed to describe the same fully for which purpose reference is to be had to the accompanying drawing which illustrates in vertical section a parachute launching device embodying the present improvements.

The launching disk 1 according to the prior specification hereinbefore referred to comprises an annular frame *a* having a depending circumferential flange *b*, the disk 1 in the form approximately of an abtuse angled cone being positively secured thereto. The said frame *a* is provided with a central flange *c* adapted to be engaged by the rubber washers *d*, *e* which are carried by the bolt *f* the latter supporting the main tape retaining member or center piece *g* and carrying the member 2 to which the trapeze or aviator's harness is attached. The parachute body *h* is compactly folded or plaited upon or above the disk 1 each fold thereof being temporarily secured in place by a thread *i* tied around it. The parachute body is connected at the aperture in the apex thereof with the launching disk, the aperture being edged with a rubber cord or ring *k* for the purpose. The tapes or rigging composed of main tapes *l* and doublet or forked tapes *m* are arranged in packs temporarily held together by readily fracturable rubber bands such as shown at *n* and *o* and stowed below the disk 1. Now according to the present invention I provide an upper disk 3 of spun metal similar to the disk 1 said disk 3 being spaced above and supported by the disk 1 by means of a preferably cylindrical member 4 held in position between the disks 1 and 3 by bolts 5 which also serve to secure the handle 6 in position on the disk 3. Interposed between the upper edge of the member 4 and the disk 3 is a disk 7 which may advantageously be of mill board or similar material and a cap 8 is positioned upon the member 4 to close it and to form a firm bearing surface for the disk 3 which latter may be provided with a central flanged aperture 9 adapted to be closed by a cap 10 to form a recess in which may conveniently be carried an instruction book 11 for the use of persons employing the device.

In order to prevent buckling of the launching disk 1 and the upper disk 3 during the launching operation I provide strengthening means for the edges thereof and I have found that steel aluminium or other metal bicycle rims 12 are suitable for this purpose, said rims being spun into the edges of the disks 1 and 3 as illustrated in the drawing.

The launching apparatus above described is inclosed in a two-part envelop of waterproof fabric consisting of the upper cover 13 and lower cover 14. It will be seen that as the rigid disk 3 is interposed between the nested parachute body and the upper fabric cover 13—instead of as herein before proposed the upper cover being in direct contact with the nested parachute—the aforesaid disk 3 will prevent said cover 13 from being forced directly upon the plaited and folded parachute body, a circumstance which as above indicated is primarily the cause of strangulation of the parachute body during the launching operation. A further important advantage resulting from the construction hereinbefore described is that the air current passing over the edge of the disk 3 induces a vacuum between the disks 1 and 3 which materially assists the launching of the parachute body from the device.

In launching the parachute the first effect of the passenger jumping or freeing himself from the aircraft is to disengage the rubber washers $d$, $e$ from the flange $c$ the lower part of the cover and the center piece $g$ being simultaneously detached while the main and doublet or forked tapes $l$ and $m$ are released in respective sequence and become extended. Thereupon the folds of the parachute are successively brought over the edge of the disk 1 until the pull of the passenger in further descending is exerted on the rubber ring $k$ which by expanding becomes disengaged from the flange $b$ and thus the parachute is completely launched. In order that all the doublet tapes $m$ may be thrown into tension simultaneously but that this operation may not anticipate the complete extension of the main tapes $l$ the links or buckles $p$ between the ends of the main and doublet tapes are supported by readily rupturable connections such as rubber bands $q$ which are attached by cords $r$ to the flange $b$ of the frame $a$. When the whole weight of the passenger is exerted on the bands $q$ their rupture would ordinarily be synchronous but desynchronization is effected by arranging the cords $r$ of different lengths. Thus shock is modulated and the weight transferred to the packs of doublet or forked tapes.

The upper and lower covers 13 and 14 respectively are laced together as at 15 with worsted or similar easily rupturable material and sealed with an appropriate seal so that before use it may readily be seen if the device has been tampered with. The lacing together of the covers 13 and 14 contribute materially to the security and efficient operation of the device for it will be seen that after the center piece has been detached from the device by the weight of the falling aviator a further heavy stress is exerted upon the seals and lacing to break them and to pull off the bottom cover 14, and these initial heavy pulls effectually prevent the possibility of premature or accidental release of the parachute due to wind pressure or other causes.

By removing the nuts 16 from the bolts 5 the disk 3 may readily be removed to permit of the assemblage of the parachute on the launching disk 1 which operation having been performed the disk 3 is again secured in position.

What I claim and desire to secure by Letters Patent of the United States is:—

1. In a parachute launching device the combination with a captive rigid launching disk adapted to support the parachute body, of another rigid disk supported by and connected with the launching disk by an intervening spacing member and disposed above and covering the parachute body.

2. In a parachute launching device in which the parachute body is arranged in symmetrical folds and plaits, the combination with the launching disk for supporting the said folded and plaited parachute body, of a rigid disk above the launching disk, an upstanding spacing member mounted on the launching disk and adapted to support the said rigid disk and means for detachably connecting the said disks and spacing member.

3. In a parachute launching device in which the parachute body is arranged in symmetrical folds and plaits, the combination with the launching disk for supporting the said folded and plaited parachute body, of a rigid disk above the launching disk, an upstanding spacing member mounted on the launching disk and adapted to support the said rigid disk and bolts for detachably connecting the said disks and spacing member.

4. In a parachute launching device in which the parachute body is arranged in symmetrical folds and plaits, the combination with the launching disk for supporting the said folded and plaited parachute body, of a rigid disk above the launching disk, an upstanding spacing member, a cap for said member and bolts for detachably connecting the said disks and spacing member.

5. In a parachute launching device in which the parachute body is arranged in symmetrical folds and plaits, the combination with the launching disk for supporting the said folded and plaited parachute body, of a rigid disk above the launching disk, an upstanding spacing member, a cap for said member, a flanged aperture in said rigid disk, a cap for said flanged aperture and bolts for detachably connecting the said disks and spacing member.

6. In a parachute launching device in which the parachute body is arranged in symmetrical folds and plaits, the combination with the launching disk for supporting the said folded and plaited parachute body, of a rigid disk above the launching disk, an upstanding spacing member, means for detachably connecting the said disks and spacing member, a bi-part cover and a center-piece detachable from the launching disk.

7. In a parachute launching device in which the parachute body is arranged in symmetrical folds and plaits, the combination of a launching disk, a rigid disk, a spacing member between the said disks, means for detachably connecting the said disks and spacing member and means for strengthening the peripheral edges of said disks.

EVERARD RICHARD CALTHROP.